US012531039B2

(12) United States Patent
Hackett

(10) Patent No.: US 12,531,039 B2
(45) Date of Patent: Jan. 20, 2026

(54) TREMOLO STABILIZATION SYSTEM

(71) Applicant: Mark E. Hackett, Lago Vista, TX (US)

(72) Inventor: Mark E. Hackett, Lago Vista, TX (US)

(73) Assignee: Mark E. Hackett, Lago Vista, TX (US)

( * ) Notice: Subject to any disclaimer, the term of this patent is extended or adjusted under 35 U.S.C. 154(b) by 251 days.

(21) Appl. No.: 18/531,310

(22) Filed: Dec. 6, 2023

(65) Prior Publication Data

US 2024/0185817 A1 Jun. 6, 2024

Related U.S. Application Data

(60) Provisional application No. 63/430,624, filed on Dec. 6, 2022.

(51) Int. Cl.
*G10D 3/153* (2020.01)

(52) U.S. Cl.
CPC .................................... *G10D 3/153* (2020.02)

(58) Field of Classification Search
CPC ........... G10D 3/153; G10D 1/085; G10D 3/00
See application file for complete search history.

(56) References Cited

U.S. PATENT DOCUMENTS 5,959,224 A * 9/1999 McCune ................ G10D 3/153
84/313

* cited by examiner

*Primary Examiner* — Kimberly R Lockett

(57) ABSTRACT

A system for stabilizing a tremolo (vibrato) of a guitar includes a tremolo stabilizer and a lockable claw that can be used in place of a traditional tremolo spring and claw, respectively. The stabilizer uses an extension spring as well as a compression spring with an adjustable preload to stabilize the tremolo. The overall length of the stabilizer can be calibrated with a thumbwheel. The locking claw uses anchor screws and a claw screw for restricting movement when the stabilizer is under tension or compression, respectively.

20 Claims, 5 Drawing Sheets

TREMOLO STABILIZATION SYSTEM

CROSS-REFERENCE TO RELATED APPLICATION

This application claims priority to U.S. Provisional Application No. 63/430,624, which was filed on Dec. 6, 2022, which is incorporated by reference herein in its entirety.

FIELD OF THE INVENTION

This disclosure relates generally to musical instruments. More specifically, it relates to guitar tremolos. Even more specifically, it relates to a guitar tremolo stabilizer. It is known by those skilled in the art that the term tremolo is a misnomer for vibrato due to Leo Fender reversing the terms.

BACKGROUND

One of the first versions of the modern tremolo (vibrato), the fulcrum tremolo, utilized as many as five springs to counter the pull of the heavy guitar strings commonly used at the time which held the tremolo tightly to the face of the guitar. This would provide stability but was only capable of lowering the pitch of the strings.

Over time, the heavier strings have fallen out of favor, with lighter strings more commonly utilized today. Additionally, fulcrum tremolos are now typically set in a floating state while using fewer springs to create a tension that is balanced against the string tension, allowing the floating tremolo to both raise and lower the pitch of the strings. Although the floating tremolo has become widely popular among musicians, some issues still remain. One problem of floating tremolos is that because they rely on a balance of tension to maintain tuning, any change in string tension can cause the guitar to go out of tune. For example, if a musician bends a string or a string breaks, this balance is upset, causing the tremolo to move, and thus causing the rest of the strings to go out of tune.

To solve this issue, various tremolo stabilizers have been developed which allow the tremolo to resist small changes in force like bending a string but still allow larger movements like from the tremolo bar. Current tremolo stabilizer designs suffer from their own problems, however. For example, some tremolo stabilizers require modifying the guitar body by drilling into it, altering it permanently and possibly damaging the guitar. Other designs rely on friction to engage the stabilizer which can be unreliable. Still other designs utilize thumb screws which are prone to falling out and becoming lost. Existing designs may also be noisy and create an undesirable "detent" characteristic at the center position. Some stabilizer designs require changing an entire spring to adjust the stabilizer and even easily adjustable designs can affect the guitar tuning when adjusted.

It would therefore be advantageous to have a device which avoids these and other drawbacks of existing devices.

SUMMARY OF THE INVENTION

A tremolo stabilization system for a guitar comprises a tremolo stabilizer and a lockable tremolo claw. The tremolo stabilizer comprises an extension spring, a compression spring having a first end and a second end, a frame slidably coupled with a piston, the piston having a through hole configured to allow the extension spring to pass through, the piston configured to hold the first end of the compression spring, and a rear external spring support, the rear external spring support having a through hole configured to allow the extension spring to pass through, the rear external spring support configured to hold the second end of the compression spring. The piston, the compression spring, and the rear external spring support are placed over the extension spring, the compression spring is connected at the first end to the piston and at the second end to the rear external spring support such that force can be transmitted between the compression spring, a tremolo block, and a guitar body. The tremolo stabilizer may further comprise a calibrating thumbwheel for adjusting an overall length of the tremolo stabilizer, a limit adjustment thumbwheel for limiting a maximum amount of movement of the piston, or a preload thumbwheel for adjusting an amount of compression on the compression spring. The stabilizer may also comprise a center mounting pin sized to fit within the extension spring, a damping ring between the piston and the frame, or a sheath, the sheath comprising a thin tubular member configured to fit between the outside diameter of the extension spring and the inside diameter of the piston through hole and the rear external spring support through hole.

The lockable tremolo claw comprises a body having a plurality of tines at a first end and a base at a second end, two clearance holes through the base for receiving anchor screws for anchoring the locking tremolo claw to a guitar body, and at least one claw screw hole in the base for receiving a claw screw for holding the lockable tremolo claw against the anchor screws and thereby preventing movement of the lockable tremolo claw away from a tremolo block of the guitar. The lockable tremolo claw may further comprise one or more holes, each hole for receiving a clamp screw for restraining a loop of a spring and a clamp bar having one or more holes that correspond to the one or more holes for receiving the clamp screw, the clamp bar for restraining one or more loops of one or more springs. The one or more holes may be threaded.

DETAILED DESCRIPTION

Existing tremolo stabilizers have several problems. Existing stabilizers can be cumbersome to install and produce have undesirable side effects in use. To avoid these issues, an improved tremolo stabilization system is provided herein.

Figure 1:
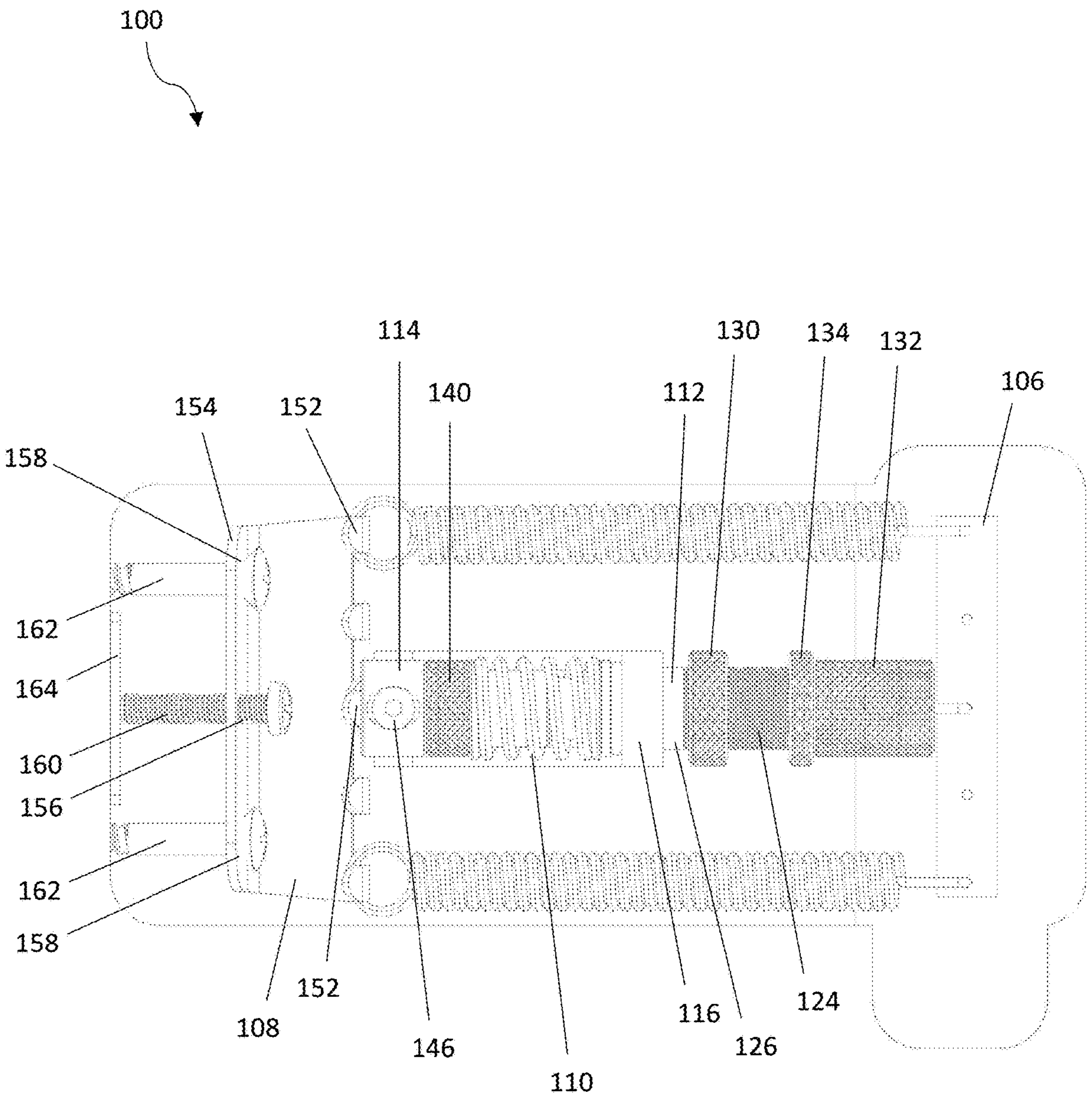
FIG. 1 a top view of a tremolo stabilization system 100 according to one embodiment mounted to a guitar.
Figure 2:
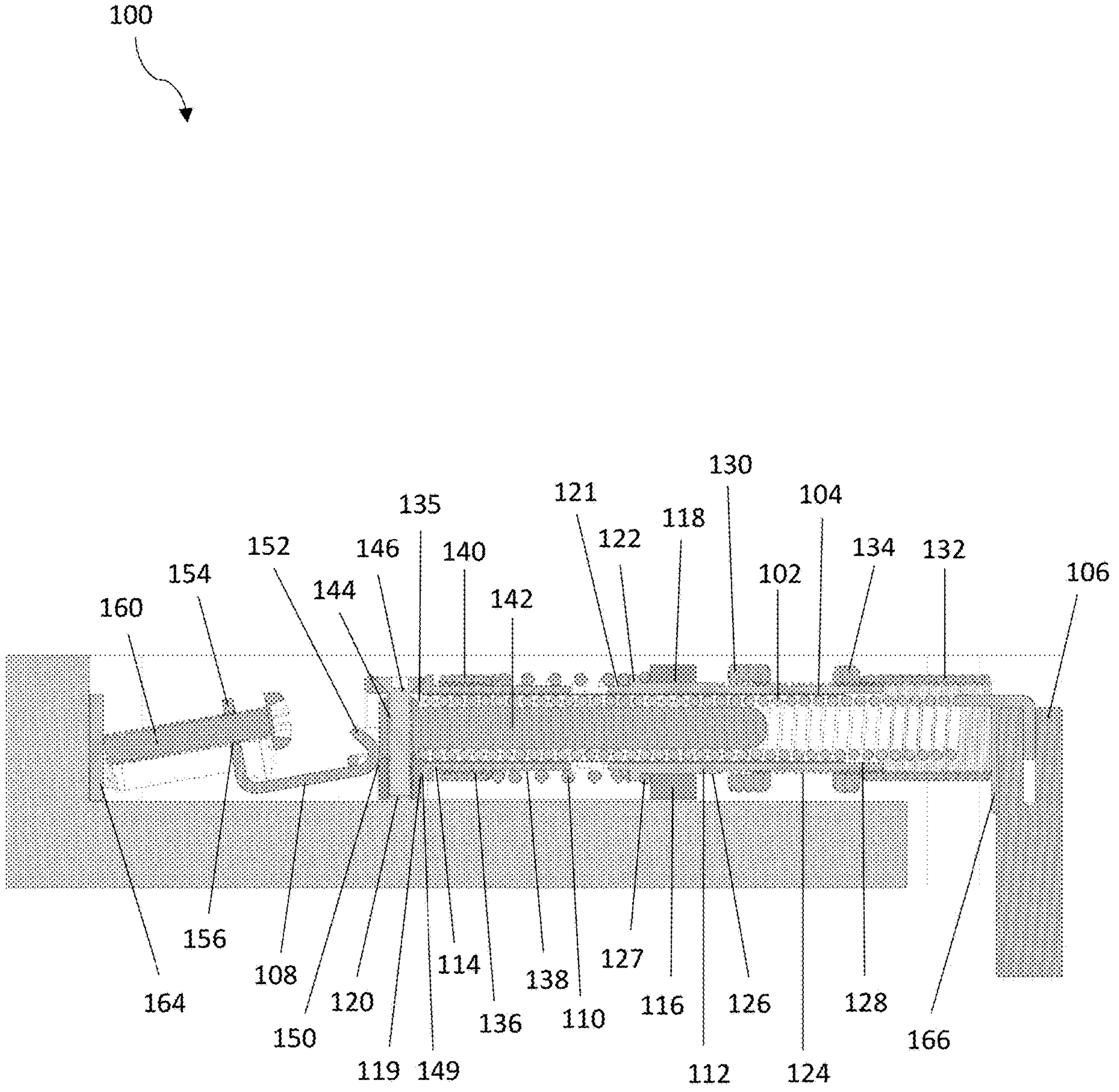
FIG. 2 depicts a section view of FIG. 1.
Figure 3:
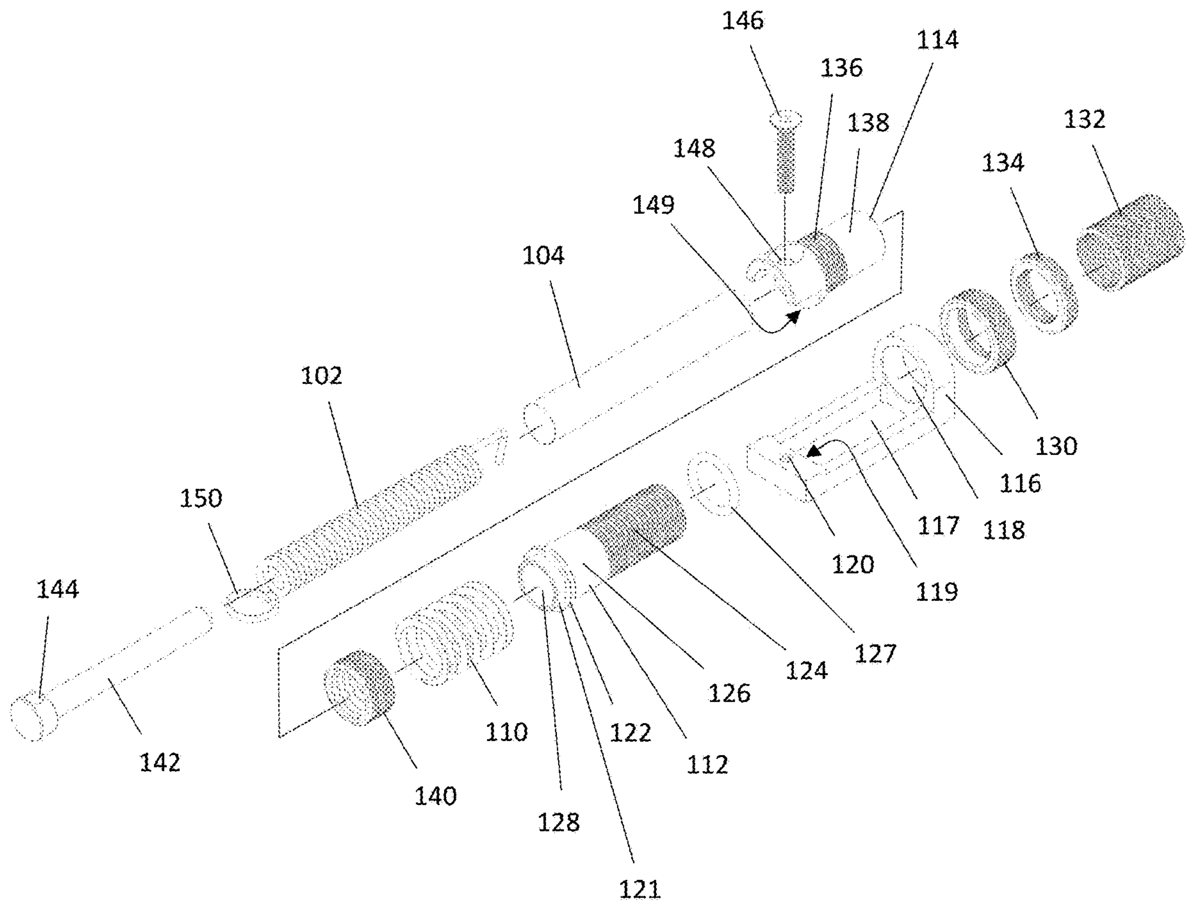
FIG. 3 depicts an exploded view of a tremolo stabilizer according to one embodiment.

FIG. 1 depicts a top view of a tremolo stabilization system 100 according to one embodiment mounted to a tremolo of a guitar. FIG. 2 depicts a section view of FIG. 1. FIG. 3 depicts an exploded view of a tremolo stabilizer according to one embodiment.

A tremolo stabilization system 100 as disclosed herein is comprised of a tremolo stabilizer and lockable tremolo claw. The tremolo stabilizer and lockable tremolo claw take the place of a traditional tremolo spring and claw.

The tremolo stabilizer is comprised of an internal stabilizer spring 102 in the form of an extension spring comprising a loop on one end and a hook on the other end. Internal stabilizer spring 102 may be similar to a typical tremolo spring with a shortened length of the vertical leg of the hook reduced to at least the diameter of the spring. Internal stabilizer spring 102 connects on one end to a standard inertia block 106 (also known as a tremolo block) and connects on the other end to lockable tremolo claw 108 which will be described in more detail later. Sheath 104 is a long thin tubular member designed to slide over internal stabilizer spring 102. Sheath 104 is designed to reduce friction, noise, and potential binding by internal stabilizer spring 102 rubbing against the other components. Sheath 104 may be made out of a polymer such as polypropylene.

A compression spring 110 is used to provide resistance but still allow compression of the stabilizer device and thus movement of the tremolo in more than one direction. Compression spring 110 is connected on one end to piston 112 and on the other end to rear external spring support 114. Piston 112 and rear external spring support 114 connect to frame 116.

Frame 116 is comprised of a body having at one end a cylindrical opening 118 parallel to internal stabilizer spring 102 and at the other end a threaded hole 120 orthogonal to the central axis of the cylindrical opening 118. Frame 116 is designed to support and guide piston 112 as well as to restrain rear external spring support 114 and therefore compression spring 110. A rectangular opening 117 in frame 116 may accommodate a portion of rear external spring support 114, preload thumbwheel 140, compression spring 110, piston 112, and damping ring 127. Surface 119 is a planar surface defining one side of rectangular opening 117.

Piston 112 is a cylindrical body having an end 121 designed to fit inside compression spring 110 and hold it in transverse alignment while shoulder 122 allows axial force to be transmitted between the piston 112 and the compression spring 110. Piston 112 has an externally threaded portion 124 and a smooth portion 126. Smooth portion 126 is designed to fit inside and slide along cylindrical opening 118. Damping ring 127 is installed over smooth portion 126 and provides a cushion or damping between shoulder 122 of piston 112 and frame 116. Damping ring 127 may be comprised of a rubber O-ring. Through hole 128 in piston 112 is sized to fit over internal stabilizer spring 102 and sheath 104.

Externally threaded portion 124 of piston 112 is designed to accept limit adjustment thumbwheel 130, calibrating thumbwheel 132, and locking thumbwheel 134 which are all externally knurled and internally threaded. Limit adjustment thumbwheel 130 can be positioned axially on piston 112 to limit movement of piston 112 and therefore compression spring 110 and inertia block 106. A portion of limit adjustment thumbwheel 130 may not be internally threaded but rather may be smooth and have a diameter larger than smooth portion 126 of piston 112, thus allowing a portion of limit adjustment thumbwheel 130 to extend over the smooth portion 126. Calibrating thumbwheel 132 is designed to adjust an overall length of the stabilizer and calibrate the position of the tremolo. Locking thumbwheel 134 is designed to perform as a jam nut to lock the calibrating thumbwheel 132 in a desired position when tightened against it.

Rear external spring support 114 has a through hole 135 sized to fit over tremolo spring 102 and sheath 104. Additionally, rear external spring support 114 has an externally threaded portion 136 and a smooth portion 138. Smooth portion 138 is designed to fit inside compression spring 110. Preload thumbwheel 140 is externally knurled and has an internally threaded hole designed to engage with externally threaded portion 136 of rear external spring support 114. Preload thumbwheel 140 can be adjusted to provide more or less compression of compression spring 110 at rest and thus adjust the amount of force required before movement of the piston 112. One advantage of the present stabilizer design is that the preload thumbwheel can be adjusted without moving the position of the tremolo and thus not affecting the tuning. In an alternative embodiment, the preload thumbwheel and externally threaded portion may be omitted from the stabilizer.

In operation, face 149 of rear external spring support 114 rests against surface 119 of frame 116, allowing a transfer of force between compression spring 110 and the various components of tremolo stabilizer 100 which will be described in greater detail later.

Center mounting pin 142 comprises a smooth shaft sized to fit within the inside diameter of internal stabilizer spring 102 and is designed to maintain alignment of the components and prevent buckling of the stabilizer. Center mounting pin 142 also comprises a head that corresponds in diameter to the rear external spring support through hole 135. The head of center mounting pin 142 comprises a transverse through hole 144 sized to accept screw 146. Screw 146 passes through a clearance hole 148 of rear external spring support 114, through hole 144 of center mounting pin 142, loop 150 of internal stabilizer spring 102, and threads into threaded hole 120 of frame 116. As screw 146 is tightened down, a bevel on the underside of the head of the center mounting pin 142 clamps the loop 150 of the spring between the pin and the rear external spring support. Also, as screw 146 is tightened, frame 116 and the top of the head of the center mounting pin 142 are pulled against the claw, securing the stabilizer to the claw in both tension and compression.

Lockable tremolo claw 108 is specially designed to provide the desired functionality of the tremolo stabilizer. Lockable tremolo claw 108 is comprised of a metal body having a plurality of tines 152, each designed to accept a loop of a tremolo spring or loop 150 of the internal stabilizer spring 102 of tremolo stabilizer 100. Opposite the tines is base 154 which comprises a threaded hole 156 in the center and two clearance holes 158. Threaded hole 156 is designed to accept claw screw 160 which threads into the hole and is therefore adjustable. Clearance holes 158 are not threaded and are designed to accept anchor screws 162 which are designed to be threaded into the body of the guitar. Anchor screws 162 attach lockable tremolo claw 108 to the guitar body and provide a limit to how far the claw can move in the direction of the inertia block. Claw screw 160 provides a limit for the claw movement in the opposite direction. Turning claw screw 160 in a first direction so as to make contact with plate 164 will constrain lockable tremolo claw 108 against the back of the heads of anchor screws 162. Turning claw screw 160 in a second direction will allow the position of lockable tremolo claw 108 to be adjusted with anchor screws 162. Alternatively, two or more claw screws can be used which may be spaced apart from the center to allow better clearance for adjusting claw screw 160. Plate 164 is a rigid body for claw screw 160 to push against to prevent the claw screw from sinking into the guitar body and therefore damaging the guitar body or becoming loose.

In use, movement of the tremolo to compress the stabilizer is resisted by compression spring 110 through the following chain of connections. Inertia block 106 presses against calibrating thumbwheel 132 which is connected to piston 112. A pad 166 may be placed between calibrating thumbwheel 132 and inertia block 106 to dampen vibration and prevent damage to the inertia block. The pad may be made of an adhesive-backed felt. Piston 112 pushes against compression spring 110, compressing the length. Compression spring 110 may be compressed until it is fully compressed or until limit alignment thumbwheel 130 contacts frame 116. Compression spring 110 pushes against preload thumbwheel 140 which is attached to rear external spring support 114. Rear external spring support 114 is connected via screw 146 to center mounting pin 142 and frame 116. Rear external spring support 114 transfers force to frame 116 via contact between surface 119 and face 149. The head of center mounting pin 142 and the frame 116 push against the tine 152 of lockable tremolo claw 108 which pushes claw screw 160 against plate 164 which pushes against the body of the guitar. If either the piston and rear external spring support make contact, or the limit alignment thumbwheel 130 contacts frame 116, compression spring 110 will no longer able to be further compressed and the compression force passes through frame 116 and rear external spring support 114 which pushes against tine 152 of lockable tremolo claw 108, claw screw 160, plate 164 and to the guitar body as described above.

Movement of the tremolo is resisted in the opposite direction described in the paragraph above by internal stabilizer spring 102 through the following chain of connections. Inertia block 106 is connected to internal stabilizer spring 102 of tremolo stabilizer 100 which is connected to lockable tremolo claw 108. Additional tremolo springs may be included outside of the stabilizer to connect the inertia block 106 to the lockable tremolo claw 108, as shown in FIG. 1. Lockable tremolo claw 108 is prevented from movement towards inertia block 106 by being anchored to the guitar body via anchor screws 162.

Figure 4:
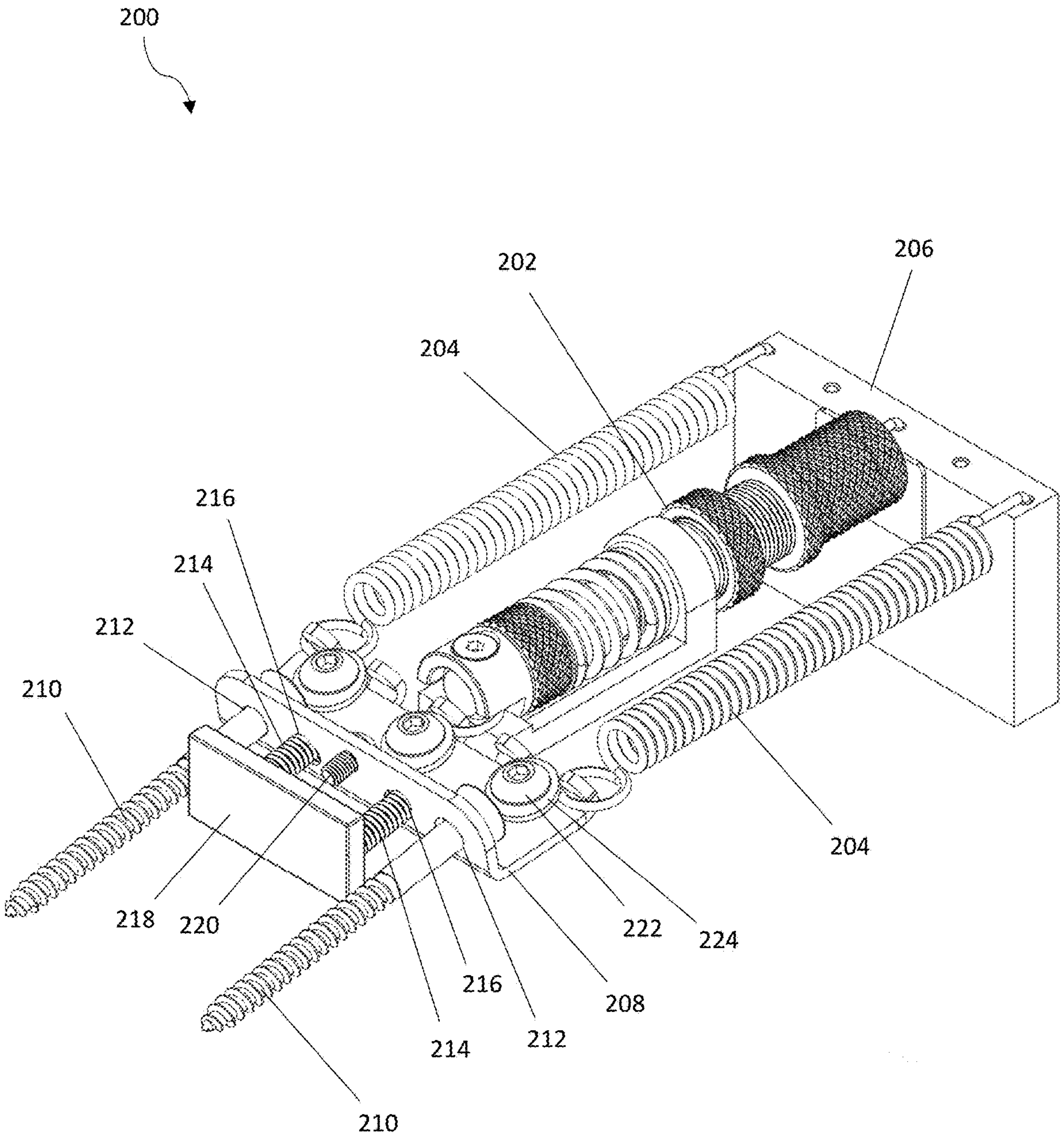
FIG. 4 depicts a tremolo stabilization system according to another embodiment.

FIG. 4 shows a perspective view of a tremolo stabilizer system 200 according to another embodiment. Tremolo stabilizer system 200 is comprised of a tremolo stabilizer 202 similar to the one shown in FIGS. 1-3. Tremolo stabilizer 202 and tremolo springs 204 are connected at one end to a standard inertia block 206 and at another end to lockable tremolo claw 208. Lockable tremolo claw 208 is designed to be secured to a guitar body via anchor screws 210 which pass through clearance holes 212 in the lockable tremolo claw. A pair of claw screws 214 are threaded through threaded holes 216. Together, anchor screws 210 and claw screws 214 secure lockable tremolo claw 208 from moving when either tension or compression is applied to the claw via the tremolo stabilizer 202 and tremolo springs 204. Plate 218 is comprised of a metal or other solid material and is designed to prevent claw screws 214 from sinking into or damaging the body of the guitar. Ground screw 220 is threaded through a threaded hole in lockable tremolo claw 208 and is designed to provide a location to secure a ground wire to. Three clamp screws 222 are attached via threaded holes in lockable tremolo claw 208. Clamp screws 222 are designed to clamp the loop of tremolo stabilizer 202 or tremolo springs 204 against the lockable tremolo claw as the clamp screws 222 are tightened. Washers 224 may be used to further facilitate clamping.

Figure 5:
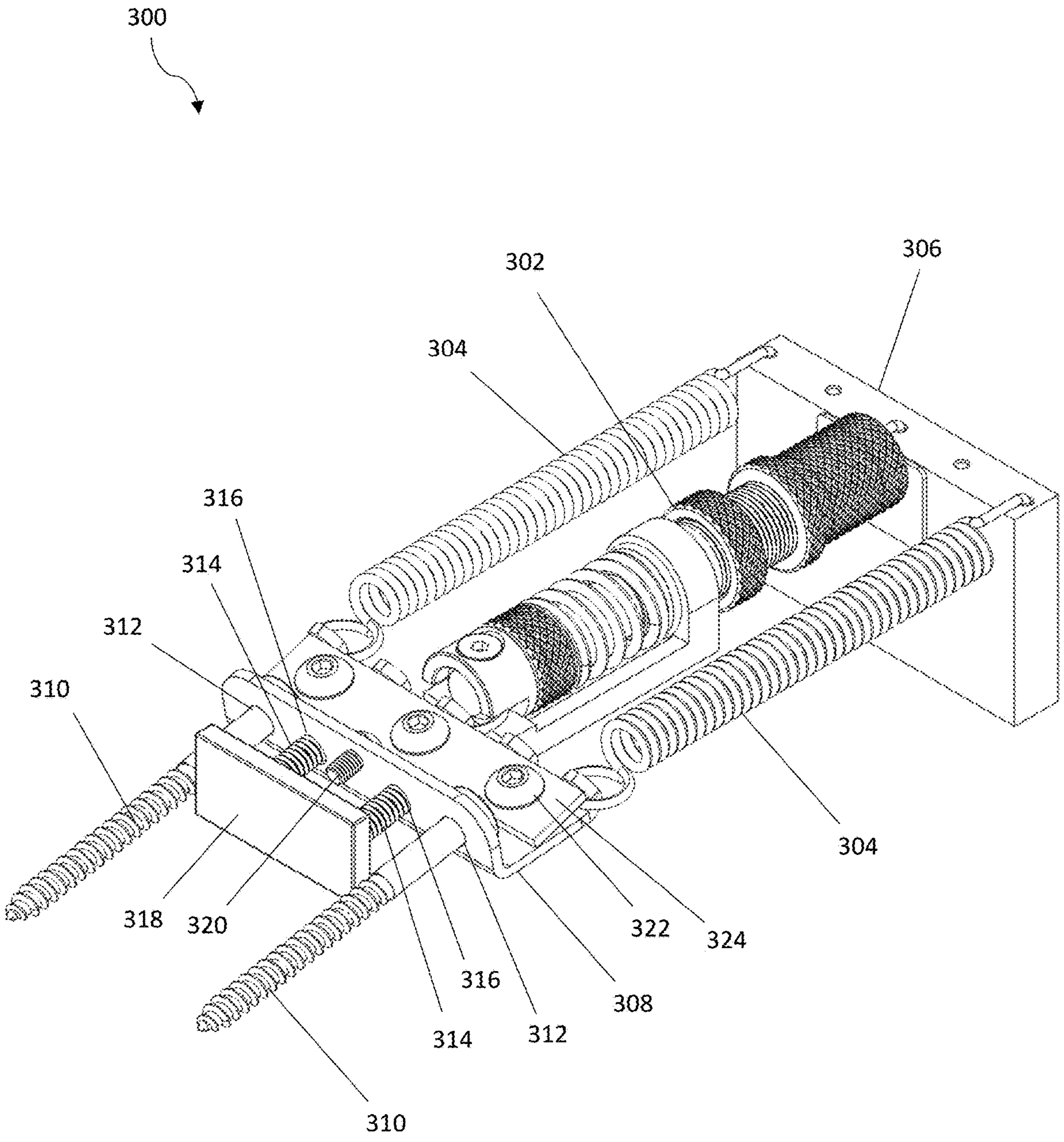
FIG. 5 depicts a tremolo stabilization system according to yet another embodiment.

FIG. 5 shows a perspective view of a tremolo stabilizer system 300 according to yet another embodiment. Tremolo stabilizer system 300 is comprised of a tremolo stabilizer 302 similar to the one shown in FIGS. 1-3. Tremolo stabilizer 302 and tremolo springs 304 are connected at one end to a standard inertia block 206 and at another end to lockable tremolo claw 308. Lockable tremolo claw 308 is designed to be secured to a guitar body via anchor screws 310 which pass through clearance holes 312 in the lockable tremolo claw. A pair of claw screws 314 are threaded through threaded holes 316. Together, anchor screws 310 and claw screws 314 secure lockable tremolo claw 308 from moving when either tension or compression is applied to the lockable tremolo claw via the tremolo stabilizer 302 and tremolo springs 304. Plate 318 is comprised of a metal or other solid material and is designed to prevent claw screws 314 from sinking into or damaging the body of the guitar. Ground screw 320 is threaded through a threaded hole in lockable tremolo claw 308 and is designed to provide a location to secure a ground wire to. Three clamp screws 322 are attached via threaded holes in lockable tremolo claw 308. Clamp screws 322 and clamp bar 324 are designed to clamp the loop of tremolo stabilizer spring 302 or tremolo springs 304. Clamp bar 324 is a flat bar with clearance holes for the clamp screws 322 to pass therethrough. One edge of clamp bar 324 rests against the claw 308 while the other edge rests on top of the loops of the tremolo stabilizer 302 and tremolo springs 304. Tightening the clamp screws 322 constrains the loops between the clamp bar 324 and the lockable tremolo claw 308 to hold the stabilizer and springs in place.

It is contemplated that such a tremolo stabilizer could take many forms without departing from the spirit of the invention.

The discussion herein of the present invention is directed to various embodiments of the invention. The term "invention" is not intended to refer to any particular embodiment or otherwise limit the scope of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to imply that the scope of the disclosure, including the claims, is limited to that embodiment.

Herein, the terms "including," "consisting of", and "comprising" are used in an open-ended fashion, and thus should be interpreted to mean "including, but not limited to." Also, the term "connect" or "connected" where used if at all is intended to mean either an indirect or direct connection. Thus, if a first component connects to a second component, that connection may be through a direct connection or through an indirect connection via other components and connections.

The term "or" is used in the inclusive manner. For example, "A or B" could mean A only, B only, or both A and B.

Certain terms are used throughout the description and claims to refer to particular system components and method steps. As one skilled in the art will appreciate, different companies may refer to a component by different names. This document does not intend to distinguish between components that differ in name but not function.

It is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A tremolo stabilizer for a guitar, comprising:

an extension spring;

a compression spring having a first end and a second end;

a frame slidably coupled with a piston, the piston having a through hole configured to allow the extension spring to pass through, the piston configured to hold the first end of the compression spring; and a rear external spring support, the rear external spring support having a through hole configured to allow the extension spring to pass through, the rear external spring support configured to hold the second end of the compression spring, wherein the piston, the compression spring, and the rear external spring support are placed over the extension spring, the compression spring connected at the first end to the piston and at the second end to the rear external spring support such that force can be transmitted between the compression spring, a tremolo block, and a guitar body.

2. The tremolo stabilizer of claim 1, further comprising:

a calibrating thumbwheel for adjusting an overall length of the tremolo stabilizer.

3. The tremolo stabilizer of claim 1, further comprising:

a limit adjustment thumbwheel for limiting a maximum amount of movement of the piston.

4. The tremolo stabilizer of claim 1, further comprising:

a preload thumbwheel for adjusting an amount of compression on the compression spring.

5. The tremolo stabilizer of claim 1, further comprising:

a center mounting pin sized to fit within the extension spring.

6. The tremolo stabilizer of claim 1, further comprising:

a damping ring between the piston and the frame.

7. The tremolo stabilizer of claim 1, further comprising:

a sheath, the sheath comprising a thin tubular member configured to fit between the outside diameter of the extension spring and the inside diameter of the piston through hole and the rear external spring support through hole.

8. A tremolo stabilizer system for a guitar, comprising:

a tremolo stabilizer, comprising:

an extension spring;

a compression spring having a first end and a second end;

a frame slidably coupled with a piston, the piston having a through hole configured to allow the extension spring to pass through, the piston configured to hold the first end of the compression spring; and a rear external spring support, the rear external spring support having a through hole configured to allow the extension spring to pass through, the rear external spring support configured to hold the second end of the compression spring, wherein the piston, the compression spring, and the rear external spring support are placed over the extension spring, the compression spring connected at the first end to the piston and at the second end to the rear external spring support such that force can be transmitted between the compression spring, a tremolo block, and a guitar body; and a lockable tremolo claw comprising:

a body having a plurality of tines at a first end and a base at a second end;

two clearance holes through the base for receiving anchor screws for anchoring the locking tremolo claw to a guitar body; and at least one claw screw hole in the base for receiving a claw screw for holding the lockable tremolo claw against the anchor screws and thereby preventing movement of the lockable tremolo claw away from a tremolo block of the guitar.

9. The tremolo stabilizer system of claim 8, wherein the tremolo stabilizer further comprises:

a calibrating thumbwheel for adjusting an overall length of the tremolo stabilizer.

10. The tremolo stabilizer system of claim 8, wherein the tremolo stabilizer further comprises:

a limit adjustment thumbwheel for limiting a maximum amount of movement of the piston.

11. The tremolo stabilizer system of claim 8, wherein the tremolo stabilizer further comprises:

a preload thumbwheel for adjusting an amount of compression on the compression spring.

12. The tremolo stabilizer system of claim 8, wherein the tremolo stabilizer further comprises:

a center mounting pin sized to fit within the extension spring.

13. The tremolo stabilizer system of claim 8, wherein the tremolo stabilizer further comprises:

a damping ring between the piston and the frame.

14. The tremolo stabilizer system of claim 8, wherein the tremolo stabilizer further comprises:

a sheath, the sheath comprising a thin tubular member configured to fit between the outside diameter of the extension spring and the inside diameter of the piston through hole and the rear external spring support through hole.

15. The tremolo stabilizer system of claim 8, wherein the lockable tremolo claw further comprises:

one or more holes, each hole for receiving a clamp screw for restraining a loop of a spring.

16. A lockable tremolo claw for a guitar, comprising:

a body having a plurality of tines at a first end and a base at a second end;

two clearance holes through the base for receiving anchor screws for anchoring the locking tremolo claw to a guitar body; and at least one claw screw hole in the base for receiving a claw screw for holding the lockable tremolo claw against the anchor screws and thereby preventing movement of the lockable tremolo claw away from a tremolo block of the guitar.

17. The lockable tremolo claw of claim 16, further comprising:

one or more holes, each hole for receiving a clamp screw for restraining a loop of a spring.

18. The lockable tremolo claw of claim 17, further comprising:

wherein the one or more holes are threaded.

19. The lockable tremolo claw of claim 17, further comprising:

a clamp bar having one or more holes that correspond to the one or more holes for receiving the clamp screw, the clamp bar for restraining one or more loops of one or more springs.

20. The lockable tremolo claw of claim 19, further comprising:

wherein the one or more holes are threaded.

* * * * *